(12) United States Patent
Hill et al.

(10) Patent No.: US 10,816,745 B2
(45) Date of Patent: Oct. 27, 2020

(54) OPTICAL FIBER PEDESTAL BOX

(71) Applicant: Clearfield, Inc., Minneapolis, MN (US)

(72) Inventors: John P. Hill, Oak Grove, MN (US); Todd M. Bade, Inver Grove Heights, MN (US); Walter E. Power, II, Jordan, MN (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 16/428,420

(22) Filed: May 31, 2019

(65) Prior Publication Data

US 2019/0369347 A1    Dec. 5, 2019

Related U.S. Application Data

(60) Provisional application No. 62/679,152, filed on Jun. 1, 2018.

(51) Int. Cl.
*G02B 6/44* (2006.01)
(52) U.S. Cl.
CPC .................. *G02B 6/4446* (2013.01)

(58) Field of Classification Search
CPC .................................................. G02B 6/4446
See application file for complete search history.

(56) References Cited

U.S. PATENT DOCUMENTS

| | | | |
|---|---|---|---|
| 5,069,516 A * | 12/1991 | Kohy | G02B 6/4439 174/38 |
| 7,333,320 B2 * | 2/2008 | Standish | G02B 6/4451 174/37 |
| 2006/0153516 A1 * | 7/2006 | Napiorkowski | G02B 6/445 385/135 |
| 2015/0253528 A1 * | 9/2015 | Corbille | G02B 6/4454 385/135 |

* cited by examiner

*Primary Examiner* — Sung H Pak
(74) *Attorney, Agent, or Firm* — Troutman Pepper Hamilton Sanders LLP

(57) ABSTRACT

An optical fiber pedestal box comprises a pedestal having a rail and an optical fiber box configured to mount to the pedestal. The optical fiber box is restricted in movement by at least one cable and the pedestal is configured to slide relative to the optical fiber box to accommodate cables moving because of ground heaving during freezing and thawing. The optical fiber pedestal box may be configured to receive different sizes and types of optical fiber cables.

16 Claims, 21 Drawing Sheets

OPTICAL FIBER PEDESTAL BOX

CROSS REFERENCE TO RELATED APPLICATION

The present application claims benefit of priority under 35 U.S.C. 119(e) to the filing date of U.S. Provisional Patent Application 62/679,152, filed on Jun. 1, 2018, entitled, "OPTICAL FIBER PEDESTAL BOX," the contents of which are incorporated herein by reference in their entirety.

TECHNICAL FIELD

The present disclosure relates generally to optical fiber management systems, and more specifically to pedestals and enclosures for interconnecting various components of fiber optic communication networks.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable. In instances when the connection may be exposed to weather conditions, an essentially waterproof configuration of components is needed.

Optical fiber connection apparatuses, such as outside plant distribution cabinets, distribution frames, pedestals, patch panels, and splice terminations are used wherever the interconnection or cross-connection of multiple optical fibers is required. For example, optical fiber cable comprising numerous individual fibers may enter a distribution cabinet, fiber frame, or patch panel for connection to the individual optical fibers that split off to provide service to homes or businesses.

SUMMARY

According to one aspect of the present disclosure, there is provided an optical fiber pedestal box comprising a pedestal having a rail and an optical fiber box configured to mount to the pedestal. The optical fiber box may be restricted in movement by at least one cable and the pedestal may be configured to slide relative to the optical fiber box. The movement of the optical fiber box may be restricted to a range determined by at least one cable. In some embodiments, the rail may be positioned at a rear panel of the pedestal and configured to slide relative to the optical fiber box.

In some embodiments, the optical fiber box may further comprise a cable entrance plate assembly. The cable entrance plate assembly may be configurable to receive different sizes and types of optical fiber cables. The cable entrance plate assembly may comprise a cable entrance plate and a top piece configured to couple to the cable entrance plate. In some embodiments, the cable entrance plate may comprise a plurality of channels of different widths for defining ports of varying sizes. In some embodiments, at least one channel of the plurality of channels may comprise a plurality of marked portions configured to be breakable so as to adjust a length of the at least one channel.

In some embodiments, the top piece nay comprise a plurality of prongs configured to interleave between the plurality of channels when the top piece is coupled to the cable entrance plate. In some embodiments, the cable entrance plate may further comprise at least one edge configured to receive the plurality of prongs of the top piece. The at least one edge may be rolled over. In some embodiments, the top piece may further comprise a side portion having a cable tie area.

According to another aspect of the present disclosure, there is provided an optical fiber pedestal box comprising a pedestal, an optical fiber box configured to mount to the pedestal, and a cable entrance plate assembly coupled to the optical fiber box and configurable to receive different sizes of optical fiber cables. The cable entrance plate assembly may comprise a plurality of channels of different widths for defining optical fiber cable ports of varying sizes, at least one channel of the plurality of channels having a plurality of marked portions configured to be breakable so as to adjust a length of the at least one channel for defining optical fiber cable ports of varying sizes.

In some embodiments, the cable entrance plate assembly may comprise a first plate including the plurality of channels, and a second plate configured to couple to the first plate. The second plate may comprise a plurality of prongs configured to interleave between the plurality of channels when the second plate is coupled to the first plate. In some embodiments, the first plate may comprise at least one edge configured to receive the plurality of prongs. In some embodiments, the second plate may further comprise a cable tie area.

In various embodiments, the pedestal may be configured to mount to a ground and slide relative to the optical fiber box so as to accommodate movement of optical fiber cables with the ground freezing and thawing. In some embodiments, the pedestal may further comprise a rail configured to slide relative to the optical fiber box. In some embodiments, movement of the optical fiber box is restricted by the optical fiber cables.

DETAILED DESCRIPTION

Aspects of the present disclosure are directed to providing outside plant optical fiber management systems, specifically optical fiber connection and distribution pedestals that accommodate a variety of weather conditions and a variety of applications that may require use of different types and sizes of cables. Various embodiments of the pedestal box disclosed herein address the problem that an optical fiber cable coming in or out of an optical fiber enclosure/pedestal heaves with the ground freezing and thawing. Various embodiments of pedestals disclosed herein may also be configured to allow use of different types and sizes of optical fiber cables.

The present disclosure is not limited in terms of the particular embodiments described in this application, which are intended as illustrations of various aspects. Many modifications and variations can be made without departing from its spirit and scope, as will be apparent to those skilled in the art.

Figure 1:
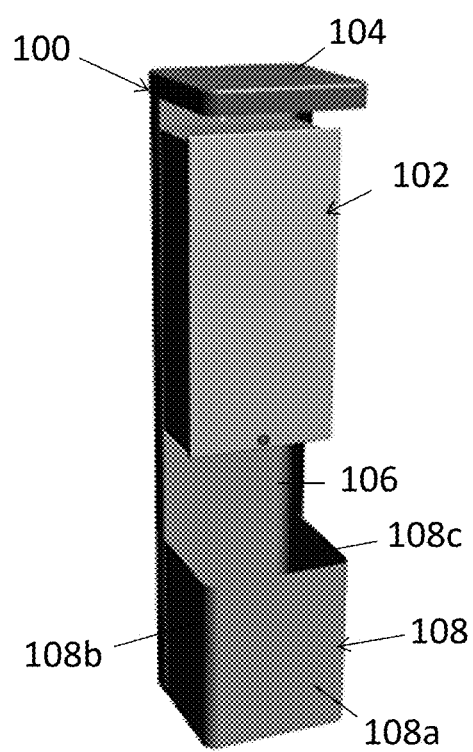
FIG. 1 is a perspective front view of one embodiment of a pedestal and optical fiber box according to aspects of the present disclosure.

FIG. 1 shows one embodiment of a pedestal 100 having an optical fiber box 102 mounted to it. The pedestal 100 has a top panel 104, a rear panel 106 and a bottom portion 108. The rear panel 106 couples the top panel 104 to the bottom portion 108. The pedestal 100 is configured to slide relative to the box 102 to address the problem that the cable coming in or out of the box and pedestal heaves with the ground freezing and thawing. The box 102 may be restricted in movement by incoming cables. However, the pedestal 100 may move up and down relative to the box 102 to accommodate cables moving because of ground heaving during freezing and thawing. The box 102 may also move along the pedestal 100 as much as cables allow. In the embodiment of FIG. 1, the bottom portion 108 includes a front panel 108a and two side panels 108b and 108c, which together with the rear panel 106 may form an enclosure configured to surround the box 102 as the pedestal 100 slides relative to the box along the rear panel 106 of the pedestal. In other embodiments, the pedestal 100 may have a different number and configuration of panels.

Figure 2A:
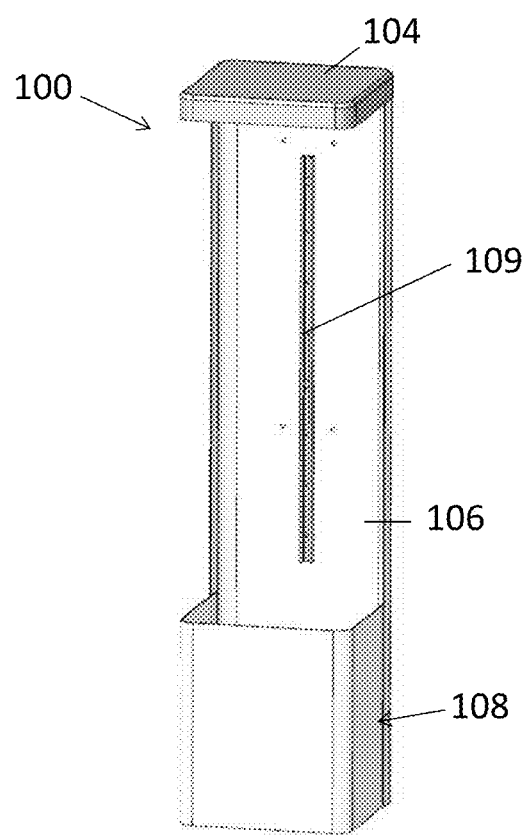
FIG. 2A is a perspective front view of the pedestal of FIG. 1 according to aspects of the present disclosure.

FIG. 2A is a perspective front view of the pedestal 100, further showing the rail 109 positioned at the rear panel 106 of the pedestal. The rail 109 is configured to receive a mounting structure of the box 102 while allowing the pedestal to move relative to the box.

Figure 2B:
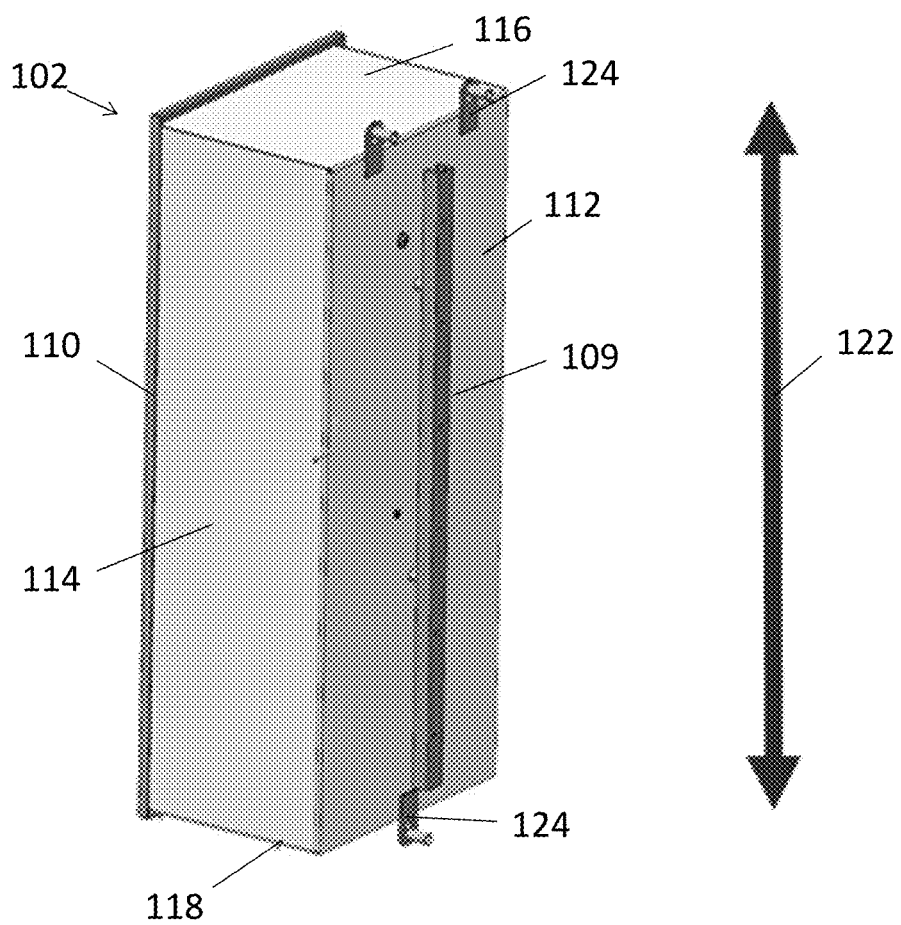
FIG. 2B is a perspective rear view of the optical fiber box of FIG. 1 coupled to the pedestal rail according to aspects of the present disclosure.

FIG. 2B is a perspective rear view of the optical fiber box 102. The box 102 is an enclosure having a front panel 110, a back panel 112, side panels 114, a top panel 116 and a bottom panel 118. In some embodiments, the front panel 110 may be a hinged door. In other embodiments, the front panel 110 may be a removable door. The pedestal 100 and the box 102 are configured to slide relative to each other. The rail 109 mounted to the pedestal 100 may slide relative to the box 102, to accommodate cable moving because of ground heaving during freezing or thawing. The vertical arrow 122 indicates the upward and downward direction of motion of the rail 109 and the pedestal 100 relative to the box 102. The box 102 further includes a plurality of mounting locations 124, such as tabs configured to receive screws, for affixing the box to the pedestal 100.

Figure 2C:
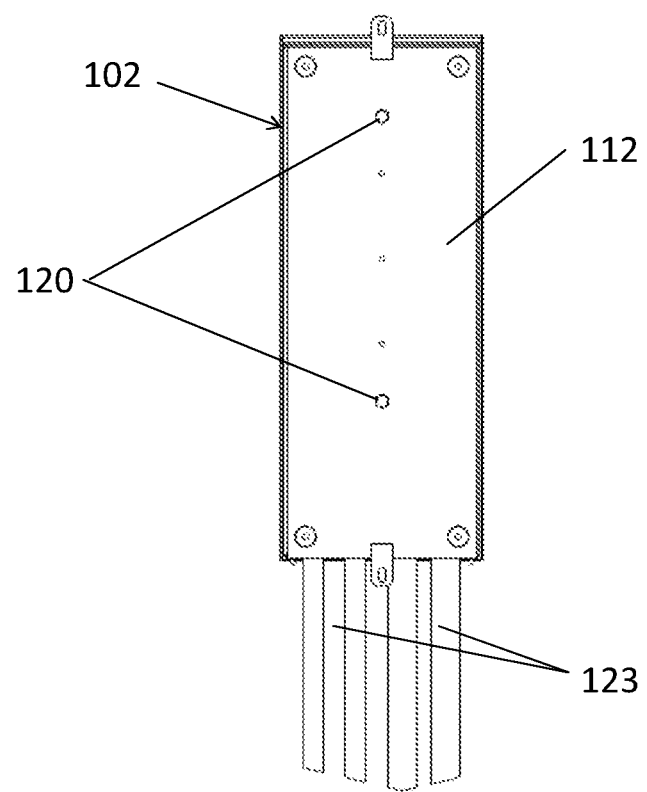
FIG. 2C is a rear view of the optical fiber box of FIG. 1 according to aspects of the present disclosure.

FIG. 2C is a rear view of the optical fiber box 102, showing the back panel 112. The back panel 112 includes a plurality of bolts 120 protruding from the box. The bolts 120 are configured to engage the rail 109 of the pedestal 100. In this embodiments, the box 102 includes two bolts 120 and the box may move up and down, that is vertically, between the two bolts. In other embodiments, the box may have a different number of bolts. FIG. 2C further shows a plurality of cables 123 entering the box from the bottom panel 118.

Figure 3A:
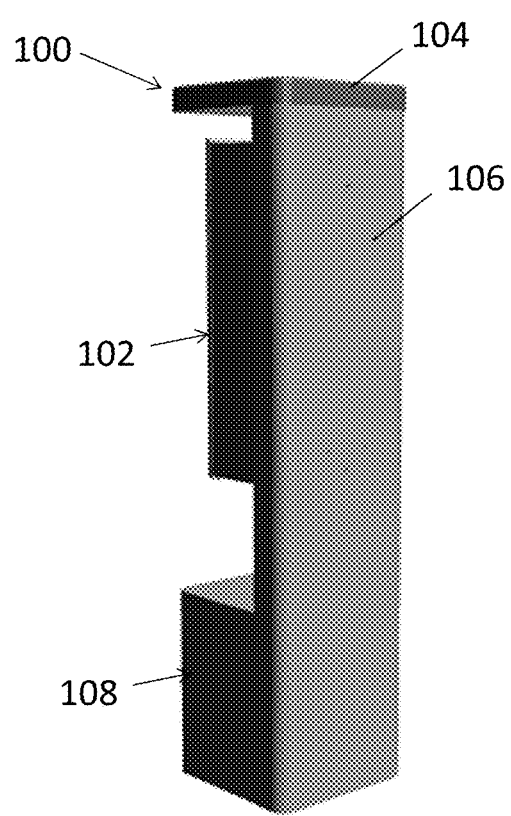
FIG. 3A is a perspective rear view of the pedestal and box of FIG. 1 according to aspects of the present disclosure.
Figure 3B:
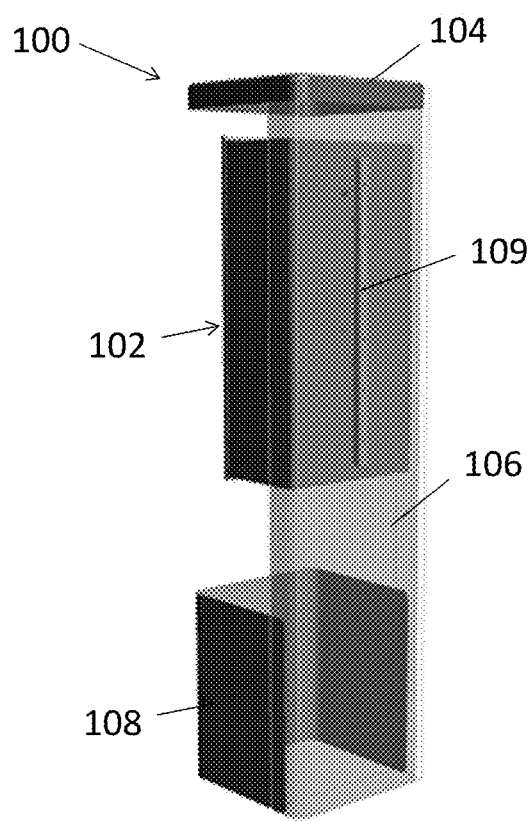
FIG. 3B is a transparent view of FIG. 3A further showing connection of the box to the pedestal according to aspects of the present disclosure.

FIG. 3A is a perspective rear view of the pedestal 100 and the box 102 mounting within the pedestal. FIG. 3A shows the rear panel 106, the top panel 104, and the bottom portion 108 that comprises a plurality of panels. FIG. 3B is a transparent view of FIG. 3A, further showing the rail 109 coupled to the pedestal 100, mounting the box 102 to the pedestal 100 such that the box may slide along the rail.

Figures 3C, 3D:
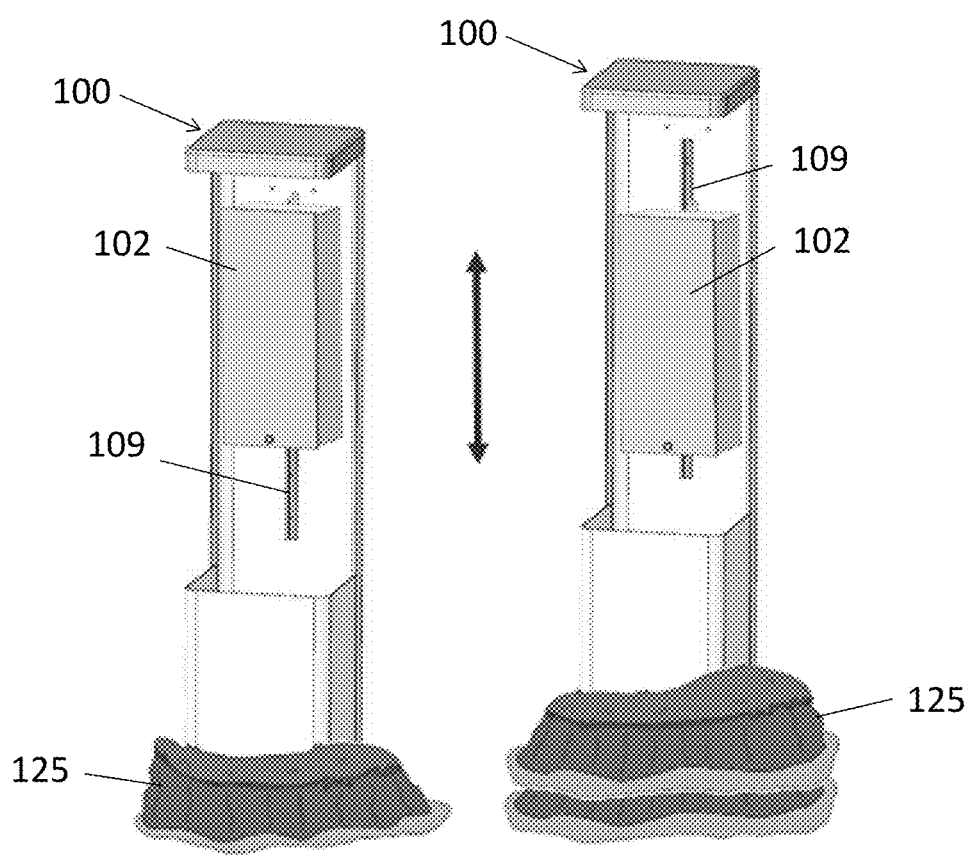
FIGS. 3C and 3D show vertical movement of the pedestal of FIG. 1 with the ground heaving according to aspects of the present disclosure.
Figure 3E:
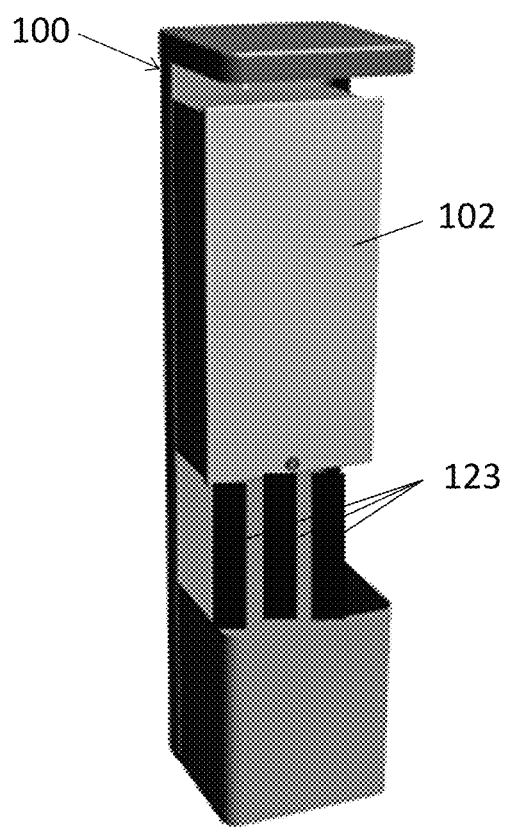
FIG. 3E is a perspective view of the pedestal and box of FIG. 1 where the box is restricted in movement by cables according to aspects of the present disclosure.

FIGS. 3C and 3D show vertical movement of the pedestal 100 with heaving of the ground 125. As shown, the pedestal 100 moves up and down along the rail 109, to accommodate cable moving because of ground heaving during freezing/thawing. The box 102 is restricted in movement by the incoming cables. Thus, the pedestal 100 moves as shown in FIGS. 3C and 3D, whereas the box 102 moves only as much as cables allow. FIG. 3E is a perspective view of the pedestal 100 and the box 102, where the box is restricted in movement by cables 123. The box 102 may remain stationary as the pedestal slides, or may move as much as the cables 123 allow.

Figure 4:
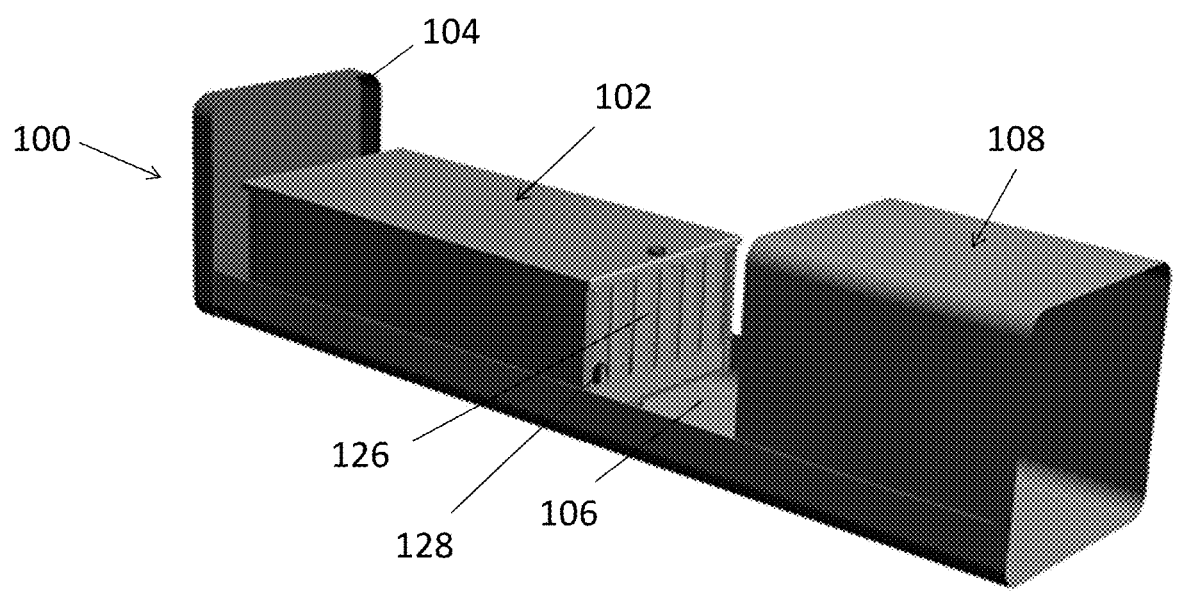
FIG. 4 is a perspective view of the pedestal and box of FIG. 1, further showing the cable entrance plate assembly of the box according to aspects of the present disclosure.
Figure 5:
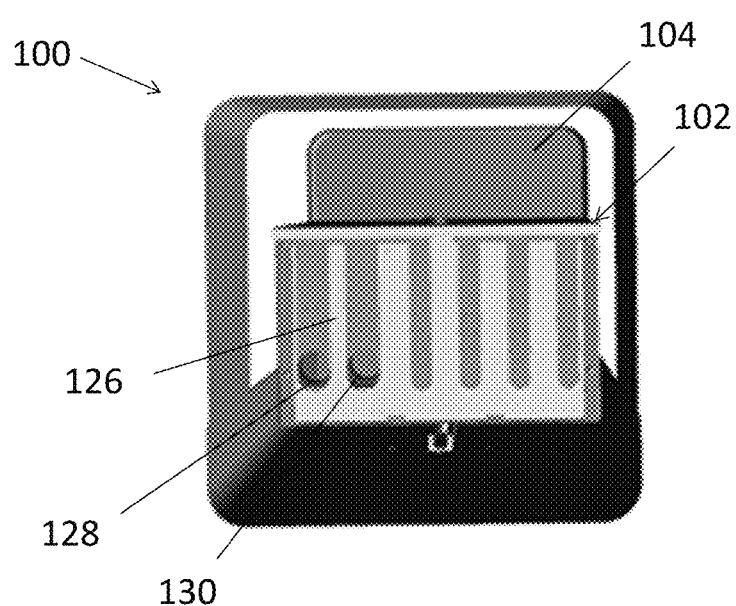
FIG. 5 is a bottom view of the pedestal and box of FIG. 1 according to aspects of the present disclosure.

FIG. 4 is a perspective view of the pedestal 100 and the box 102. The box 102 comprises a cable entrance plate assembly 126 disposed at the bottom of the box. The cable entrance plate assembly 126 is configured to receive at least one cable. Cables are received through ports, such as port 128, which may be adjusted to accommodate different types and sizes of cables, as described further below. FIG. 5 is a bottom view of the pedestal 100 and the box 102, showing the cable entrance plate assembly 126 and two ports 128 and 130 for receiving cables.

Figure 6:
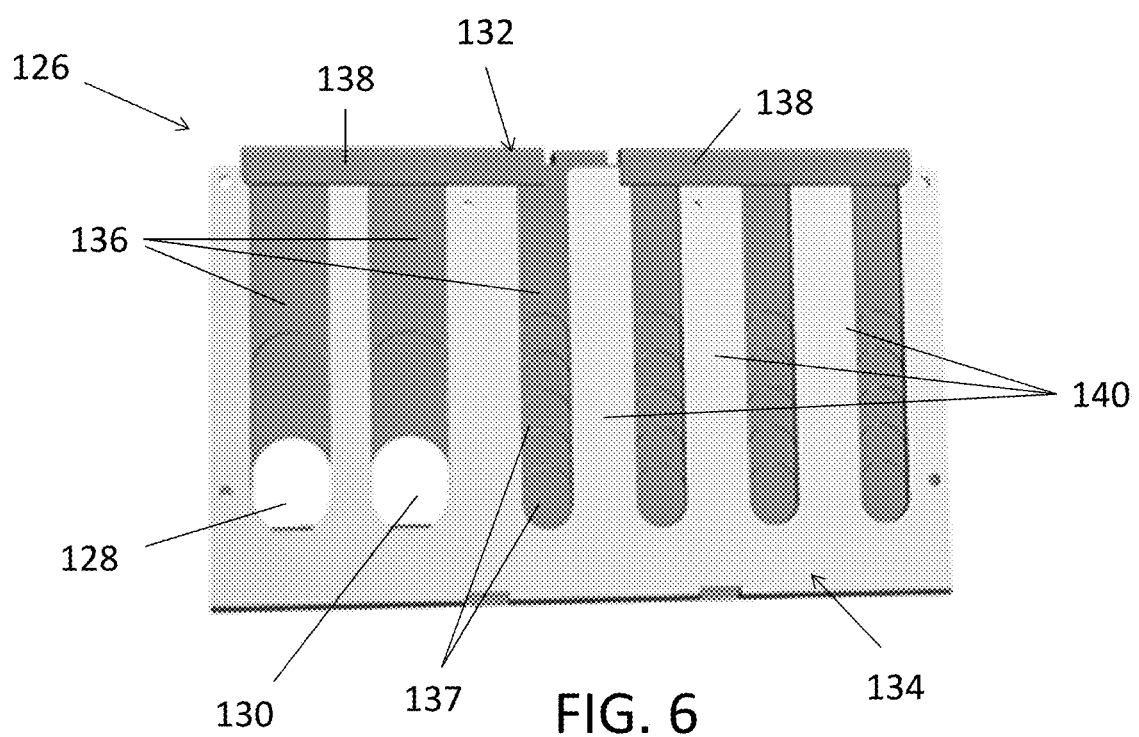
FIG. 6 is a bottom view of the cable entrance plate assembly of the box of FIG. 1 according to aspects of the present disclosure.

FIG. 6 is a bottom view of the cable entrance plate assembly 126, configured to have two ports 128 and 130 for cable entry. The cable entrance plate assembly 126 includes a cable entrance plate 132 and a top piece 134. The cable entrance plate 132 is coupled to the top piece 134. The cable entrance plate 132 includes edges 138 and a plurality of configurable channels 136 that may be adjusted to define ports of varying sizes for receiving cables of different types and sizes. The plurality of channels may have different widths. For example, in the embodiment of FIG. 6, the six channels include two wider channels and four narrower channels. Other embodiments may include a different number of channels having varying widths or the same widths. The lengths of each of the channels 136 may be adjusted to define ports of varying sizes for different types and sizes of cables. In one embodiment, each channel 136 may comprise one or more marked breakable portions 137 that may be removed to adjust the length of the channel. In other embodiments, the breakable portions 137 may be configured to slide to adjust the length of the corresponding channel 136. The channels 136 have score marks where an installer may break out one or more breakable portions 137 depending on the size of the cable coming in. The breakable portions 137 may be removed, for example, with pliers or similar instruments, as shown and discussed in relation to FIGS. 9A to 9C.

The top piece 134 of the cable entrance plate assembly 128 includes a plurality of prongs 140. The cable entrance plate 132 is disposed against the plurality of prongs 140 such that the prongs separate the plurality of channels 136. The prongs 140 have different widths that correspond to the widths of the channels 136 such that the cable entrance plate 132 fits into the top piece 134. For example, the wider channels are separated by narrower prongs and the narrower channels are separated by wider prongs. The edges 138 of the cable entrance plate 132 are configured to receive the prongs 140 of the top piece 134 to support positioning of the plate against the top piece. The cable entrance plate 132 may include a single edge extending along the plate or a plurality of edges.

Figure 7A:
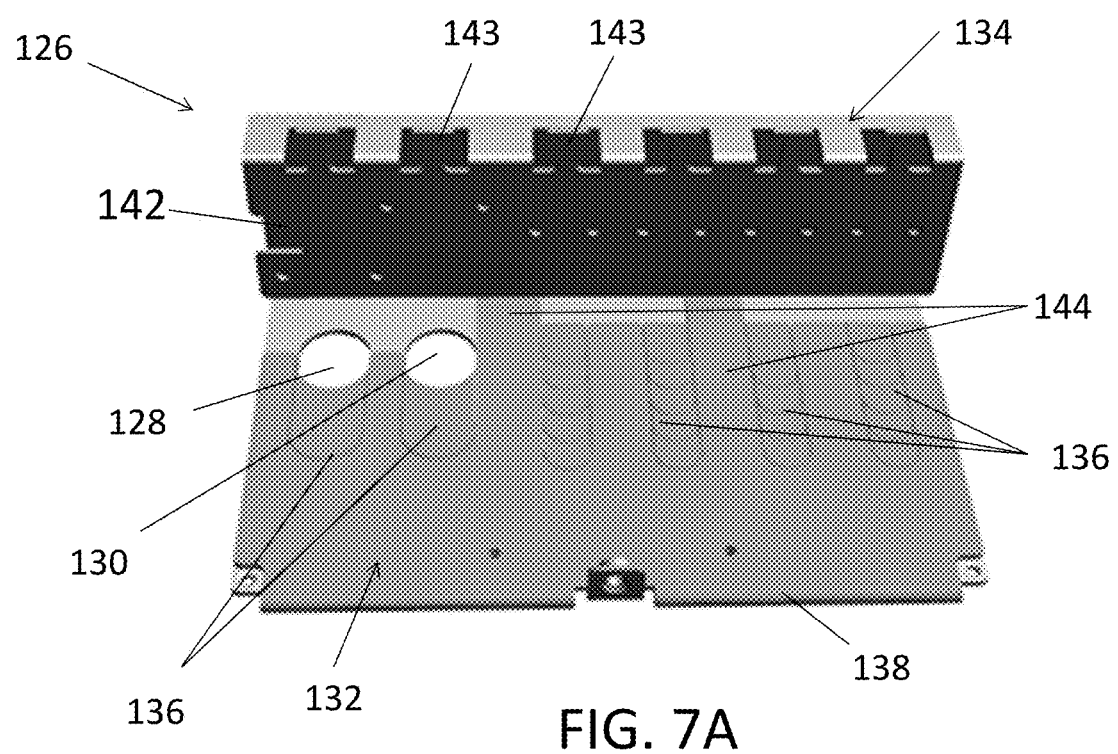
FIG. 7A is a perspective view of the cable entrance plate assembly of FIG. 6 according to aspects of the present disclosure.

FIG. 7A is a perspective view of the cable entrance plate assembly 126, further showing a perspective view of the top piece 134. In addition to the plurality of prongs 140 shown in FIG. 6, the top piece 134 further includes a side portion 142. The top piece 134 is rolled over for strength. The side portion 142 includes cable tie areas 143 in the shape of cut out T's.

FIG. 7A further shows the inside surface of the cable entrance plate 132, including the plurality of adjustable channels 136, along with the cable entry ports 128 and 130. Further, the cable entrance plate 132 includes two protrusions 144 that extend to the top piece 134 to support positioning of the plate against the top piece. Other embodiments of the plate may include a different number of protrusions.

Figure 7B:
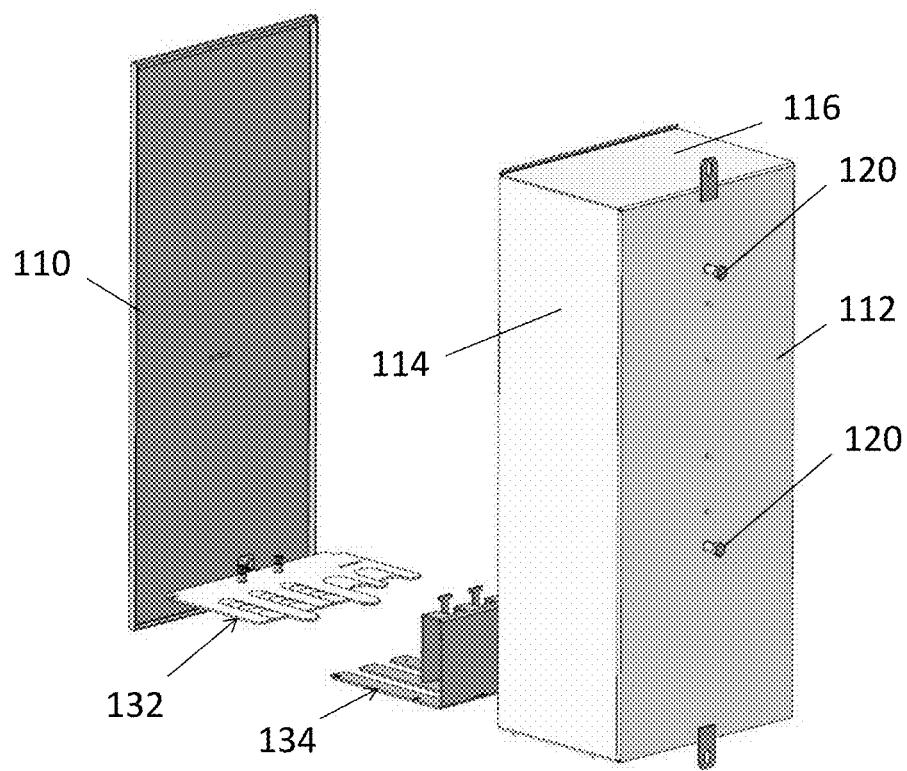
FIG. 7B is a perspective disassembled view of the cable entrance plate assembly of FIG. 6 within the box of FIG. 1 according to aspects of the present disclosure.

FIG. 7B is a perspective disassembled view of the cable entrance plate assembly 126 within the box 102. As shown, the cable entrance plate assembly 126 comprises the cable entrance plate 132 and the top piece 134 that are coupled to each other. The cable entrance plate assembly 126 is disposed within the box 102. The front panel 110 of the box 102 may be removed to insert the cable entrance plate assembly 126 into the box.

Figure 8:
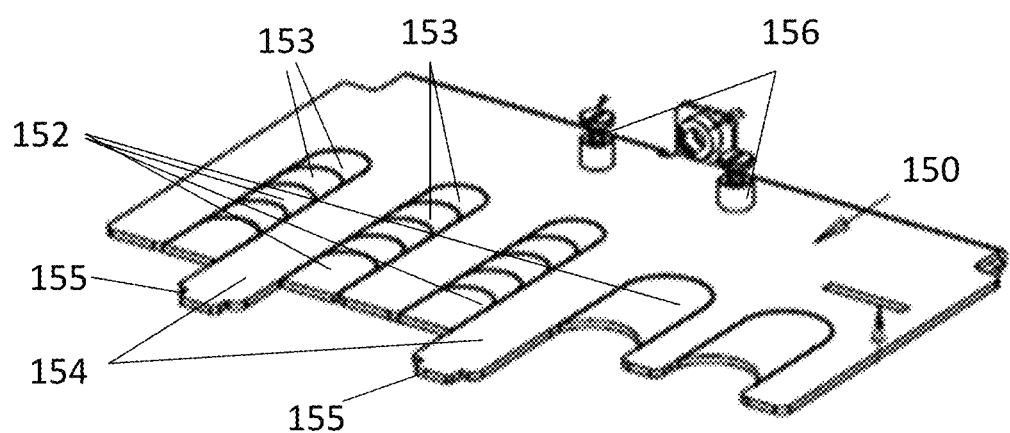
FIG. 8 is a perspective view of one embodiment of a cable entrance plate of a cable entrance plate assembly according to aspects of the present disclosure.
Figure 12:
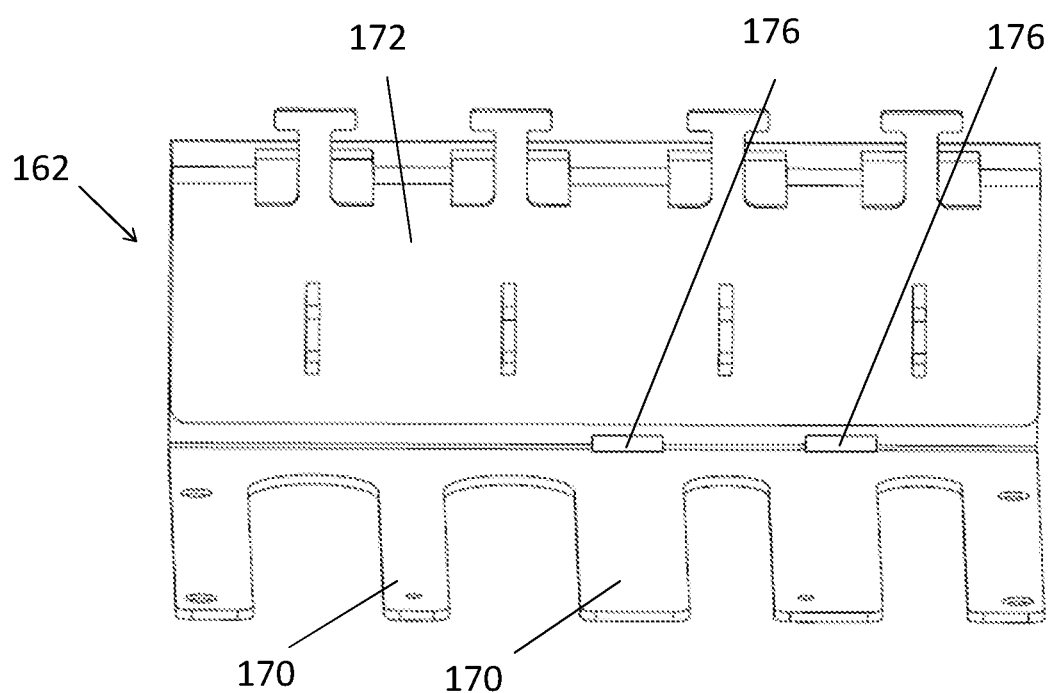
FIG. 12 is a perspective view of a portion of the top piece of FIG. 11 according to aspects of the present disclosure.

FIG. 8 is a perspective view of one embodiment of a cable entrance plate 150 having five channels 152. Each of the channels 152 includes a plurality of marked breakable portions 153 that may be removed to create a port or to enlarge a port so as to accommodate different sizes of cables. As shown, the cable entrance plate 150 further includes protrusions 154 configured to fit into the top piece of a cable entrance plate assembly. Each of the protrusions 154 includes a tab 155 positioned at the tip thereof and configured to engage a corresponding slot in the top piece as shown and discussed further below in relation to FIGS. 12, 13A and 13B. The cable entrance plate 150 further includes mounting features 156 for coupling the cable entrance plate 150 to a corresponding top piece to form a cable entrance plate assembly.

Figure 9A:
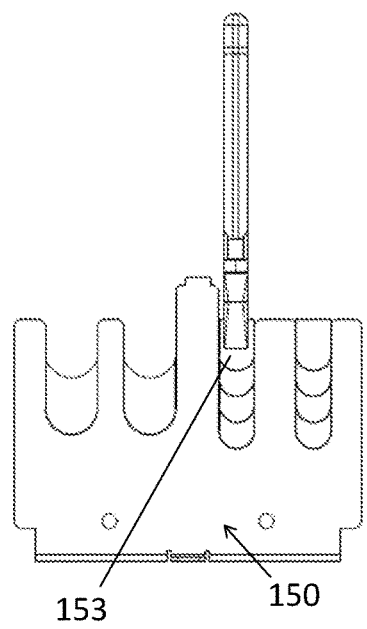
FIGS. 9A to 9C show removal of a marked breakable portion of the cable entrance plate of FIG. 8 to create a larger port according to aspects of the present disclosure.
Figure 9B:
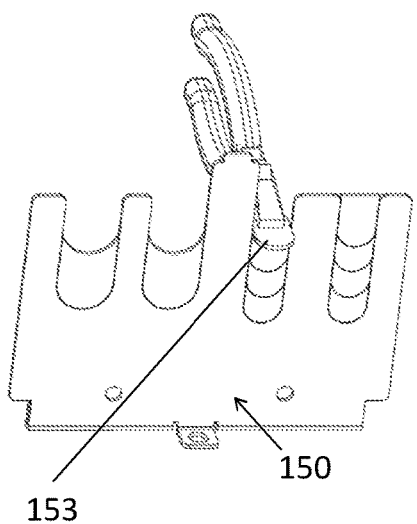
Figure 9C:
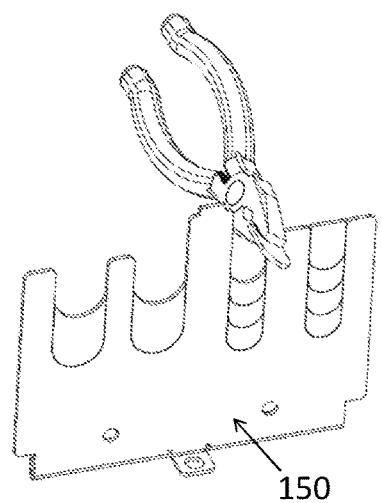

FIGS. 9A to 9C show removal of a marked breakable portion 153 of the cable entrance plate 150 to create a larger port for receiving incoming cable. The breakable portions 153 are separated by score marks. The breakable portions 153 are removed, for example, with pliers as shown in FIGS. 9A to 9C. The breakable portions 153 may be removed, for example, to accommodate more cables added to the box, or to accommodate cables of different sizes.

Figure 10:
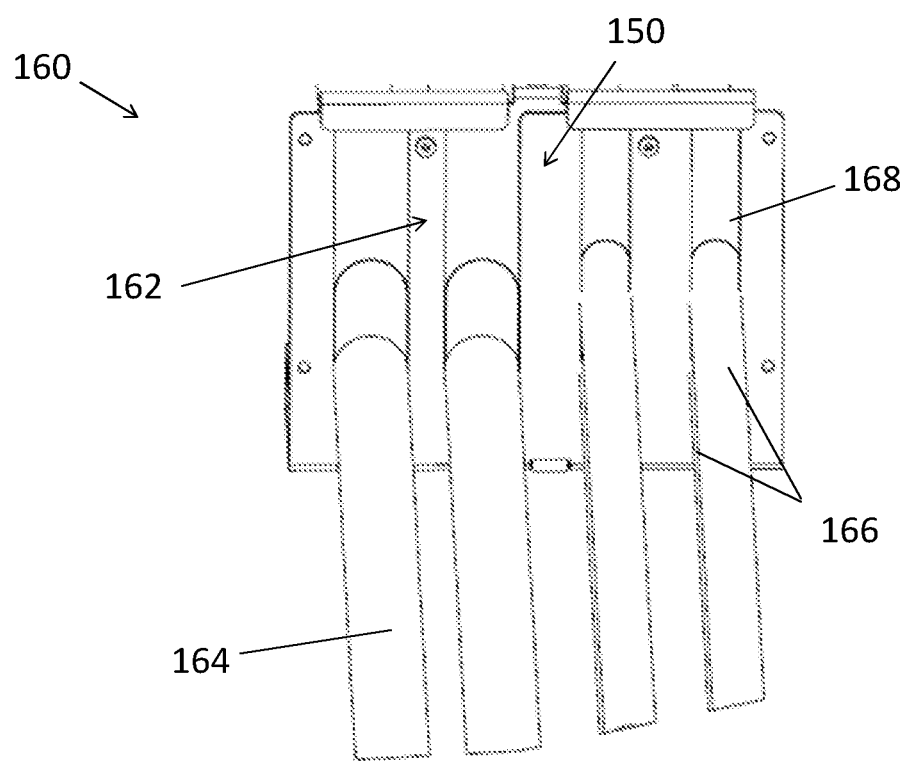
FIG. 10 is a bottom view of a cable entrance plate assembly receiving incoming cables according to aspects of the present disclosure.

FIG. 10 is a bottom view of a cable entrance plate assembly 160 comprising the cable entrance plate 150 coupled to a top piece 162. The cable entrance plate assembly 160 receives incoming cables of different sizes. For example, the incoming cable 164 has a different size compared to the two incoming cables 166 entering through ports in channel 168.

Figure 11:
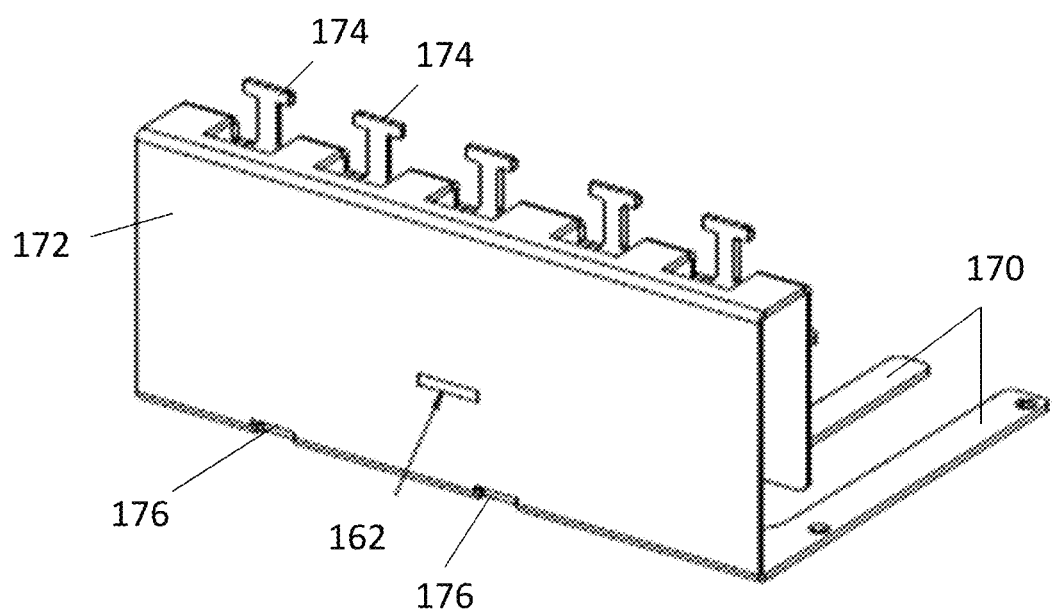
FIG. 11 is a perspective view of one embodiment of a top piece of a cable entrance plate assembly according to aspects of the present disclosure.

FIG. 11 is a perspective view of one embodiment of a top piece 162 of a cable entrance plate assembly, such as the cable entrance plate assembly 160 of FIG. 10. The top piece 162 is configured to receive and couple to the cable entrance plate 150 of FIG. 8. As shown, the top piece 162 includes a plurality of prongs 170 and a side portion 172. As shown in FIG. 11, the side portion 172 is rolled over for strength. The side portion 172 includes cable tie areas 174 in the shape of cut out T's. The side portion 172 further includes slots 176 configured to receive tabs 155 of the cable entrance plate 150 shown in FIG. 8. The slots 176 are further shown in FIG. 12, which is a perspective view of a portion of the top piece 162.

Figure 13A:
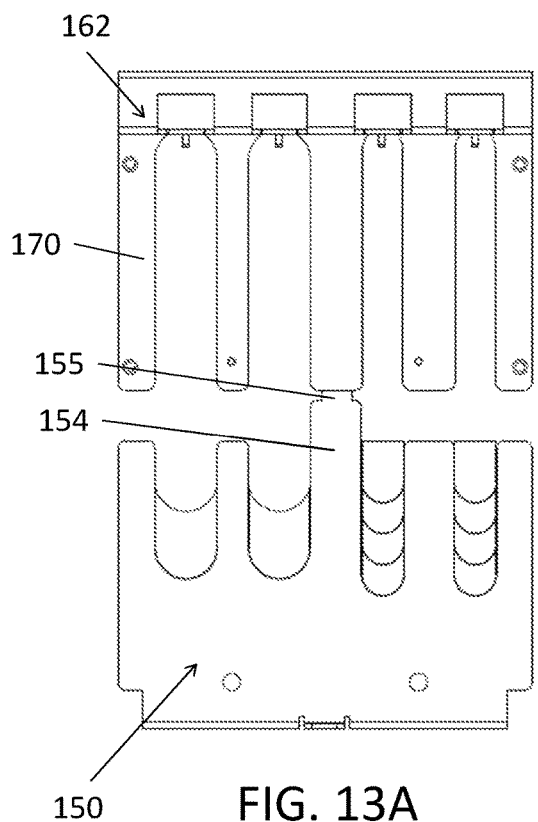
FIGS. 13A and 13B are perspective views of a disassembled cable entrance plate assembly according to aspects of the present disclosure.
Figure 13B:
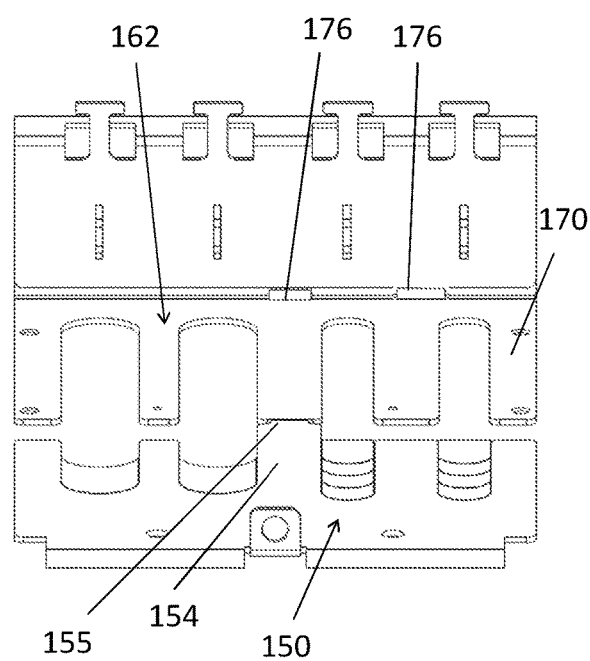
Figure 14:
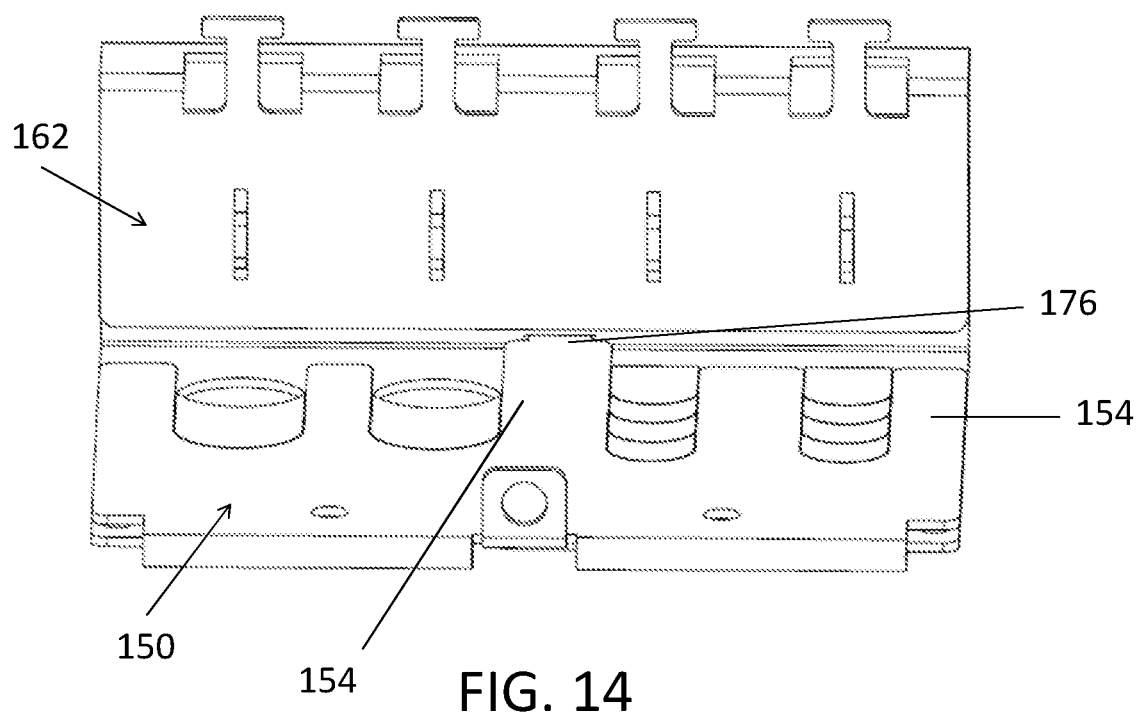
FIG. 14 is a perspective view of a portion of an assembled cable entrance plate assembly according to aspects of the present disclosure.

FIGS. 13A and 13B are perspective views of a disassembled cable entrance plate assembly 160 comprising the cable entrance plate 150 and the top piece 162. The cable entrance plate 150 includes protrusions 154 having tabs 155 at the tips of the protrusions. The top piece 162 includes prongs 170 and slots 176. The slots 176 are configured to receive the tabs 155 to couple the cable entrance plate 150 with the top piece 162. The tabs 155 are inserted into the slots 176 to strengthen and combine the cable entrance plate 150 and the top piece 162 into the cable entrance plate assembly, as shown in FIG. 14.

Figure 15A:
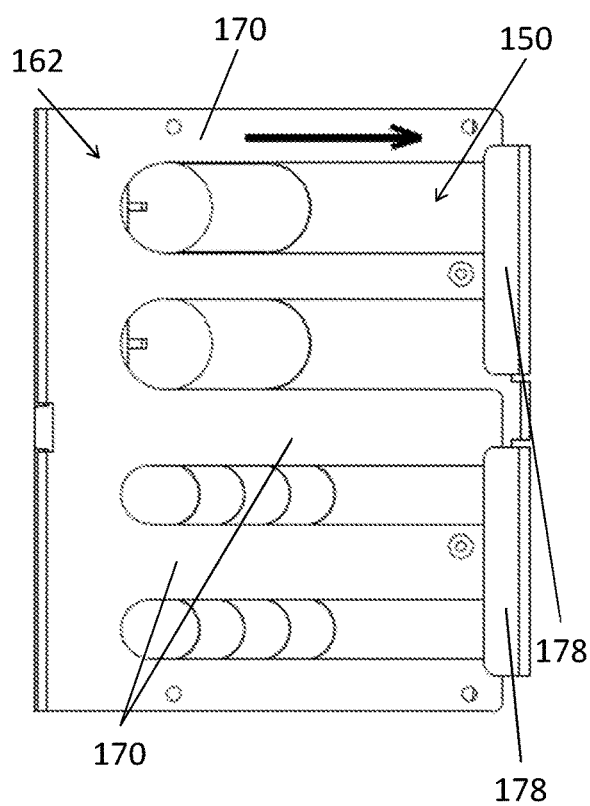
FIGS. 15A and 15B show coupling of the cable entrance plate and the top piece to form a cable entrance plate assembly according to aspects of the present disclosure.
Figure 15B:
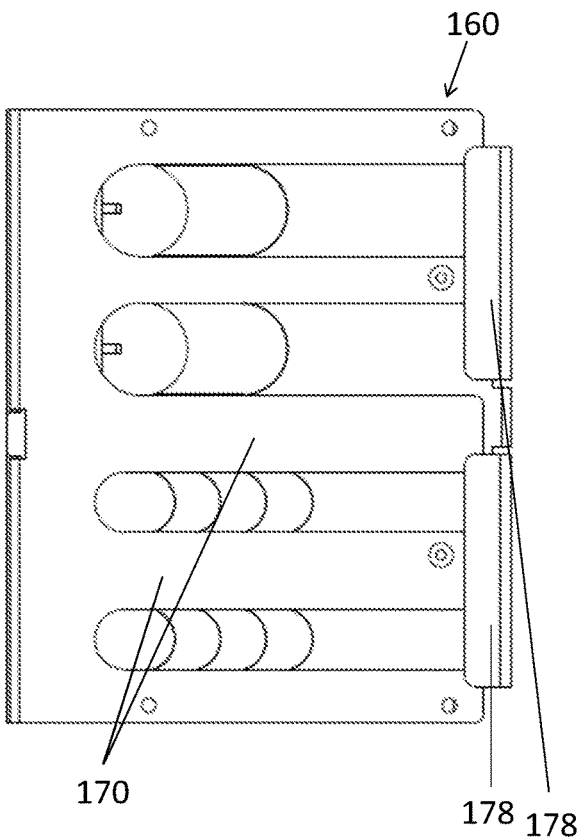

FIGS. 15A and 15B show coupling of the cable entrance plate 150 and the top piece 162 to form a cable entrance plate assembly 160. As shown in FIG. 15A, the cable entrance plate 150 includes edges 178 that are rolled over and configured to receive at least some of the prongs 170 of the top piece 162 to support positioning of the plate against the top piece. The edge 178 may be a French roll, that is rolled over sheet metal having space for the prongs. The top piece 162 slides towards the edges 178 of the cable entrance plate 150 along the direction of the arrow such that the prongs 170 slide under the edges. The cable entrance plate 150 may include a single edge extending along the plate or a plurality of edges.

Figure 16:
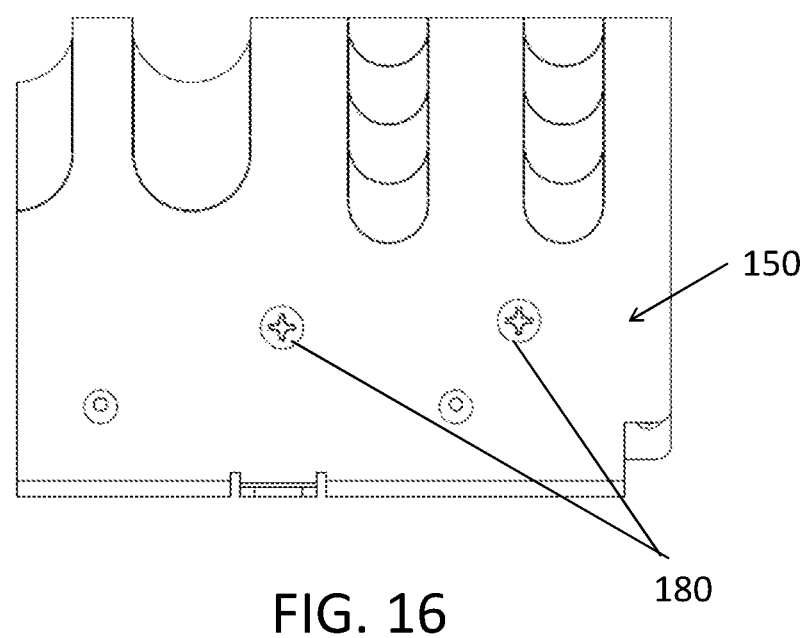
FIG. 16 is a top view showing coupling of the cable entrance plate to the top piece according to aspects of the present disclosure.

FIG. 16 is a top view showing the cable entrance plate 150 being coupled to the top piece 162 by screws 180. In other embodiments, a different number of screws of a different coupling mechanism may be used.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiment.

The invention claimed is:

1. An optical fiber pedestal box comprising:
a pedestal having a rail;
an optical fiber box configured to mount to the pedestal; and
a cable entrance plate assembly comprising a cable entrance plate having a plurality of channels, and a top piece configured to couple to the cable entrance plate, the top piece having a plurality of prongs configured to interleave between the plurality of channels when the top piece is coupled to the cable entrance plate;
wherein the optical fiber box is restricted in movement by at least one cable and the pedestal is configured to slide relative to the optical fiber box.

2. The optical fiber pedestal box of claim 1, wherein the movement of the optical fiber box is restricted to a range determined by the at least one cable.

3. The optical fiber pedestal box of claim 1, wherein the rail is positioned at a rear panel of the pedestal and configured to slide relative to the optical fiber box.

4. The optical fiber pedestal box of claim 1, wherein the cable entrance plate assembly is configurable to receive different sizes and types of optical fiber cables.

5. The optical fiber pedestal box of claim 1, wherein the plurality of channels have different widths for defining ports of varying sizes.

6. The optical fiber pedestal box of claim 1, wherein at least one channel of the plurality of channels comprises a plurality of marked portions configured to be breakable so as to adjust a length of the at least one channel.

7. The optical fiber pedestal box of claim 1, wherein the cable entrance plate further comprises at least one edge configured to receive the plurality of prongs of the top piece.

8. The optical fiber pedestal box of claim 7, wherein the at least one edge is rolled over.

9. The optical fiber pedestal box of claim 1, wherein the top piece further comprises a side portion having a cable tie area.

10. An optical fiber pedestal box comprising:
a pedestal;
an optical fiber box configured to mount to the pedestal; and
a cable entrance plate assembly coupled to the optical fiber box and configurable to receive different sizes of optical fiber cables;
wherein the cable entrance plate assembly comprises:
a first plate including a plurality of channels, at least one channel of the plurality of channels having a plurality of marked portions configured to be breakable so as to adjust a length of the at least one channel for defining optical fiber cable ports of varying sizes, and
a second plate including a plurality of prongs configured to interleave between the plurality of channels when the second plate is coupled to the first plate.

11. The optical fiber pedestal box of claim 10, wherein one or more channels of the plurality of channels have a different width from the remaining channels of the plurality of channels for defining optical fiber cable ports of varying sizes.

12. The optical fiber pedestal box of claim 10, wherein the first plate comprises at least one edge configured to receive the plurality of prongs.

13. The optical fiber pedestal box of claim 12, wherein the second plate further comprises a cable tie area.

14. The optical fiber pedestal box of claim 10, wherein the pedestal is configured to mount to a ground and slide relative to the optical fiber box so as to accommodate movement of optical fiber cables with the ground freezing and thawing.

15. The optical fiber pedestal box of claim 14, wherein the pedestal further comprises a rail configured to slide relative to the optical fiber box.

16. The optical fiber pedestal box of claim 14, wherein movement of the optical fiber box is restricted by the optical fiber cables.

* * * * *